United States Patent
Holdampf (10) Patent No.: US 8,313,144 B2
(45) Date of Patent: Nov. 20, 2012

(54) STAND UP AND KNEEL SEAT

(75) Inventor: Carl J. Holdampf, Farmington Hills, MI (US)

(73) Assignee: Intier Automotive Inc, Newmarket (CA)

( * ) Notice: Subject to any disclaimer, the term of this patent is extended or adjusted under 35 U.S.C. 154(b) by 428 days.

(21) Appl. No.: 12/523,105

(22) PCT Filed: Jan. 16, 2008

(86) PCT No.: PCT/CA2008/000063
§ 371 (c)(1),
(2), (4) Date: Jul. 14, 2009

(87) PCT Pub. No.: WO2008/086597
PCT Pub. Date: Jul. 24, 2008

(65) Prior Publication Data
US 2010/0052389 A1    Mar. 4, 2010

Related U.S. Application Data

(60) Provisional application No. 60/880,672, filed on Jan. 16, 2007.

(51) Int. Cl.
*A47C 1/00* (2006.01)
(52) U.S. Cl. .... 297/340; 297/353; 297/341; 297/378.12
(58) Field of Classification Search .................. 297/353, 297/340, 341, 321, 324, 334, 378.13; 296/65.09
See application file for complete search history.

(56) References Cited

U.S. PATENT DOCUMENTS

| 6,000,742 | A  | * | 12/1999 | Schaefer et al. | 296/65.09 |
| 6,578,919 | B2 | * | 6/2003  | Seibold et al.  | 297/331   |
| 6,595,588 | B2 |   | 7/2003  | Ellerich et al. |           |
| 6,676,216 | B1 | * | 1/2004  | Freijy et al.   | 297/335   |
| 6,964,452 | B2 | * | 11/2005 | Kammerer        | 297/331   |
| 7,014,263 | B2 | * | 3/2006  | Mukoujima et al.| 297/341   |
| 7,040,684 | B2 | * | 5/2006  | Tame et al.     | 296/65.09 |
| 7,300,107 | B2 | * | 11/2007 | Kammerer        | 297/336   |
| 7,562,926 | B2 | * | 7/2009  | Kojima          | 296/65.13 |
| 2005/0269830 | A1 |  | 12/2005 | Epaud         |           |

FOREIGN PATENT DOCUMENTS

DE            20200604326            7/2006
(Continued)

OTHER PUBLICATIONS

European Search Report.

*Primary Examiner* — Laurie Cranmer
(74) *Attorney, Agent, or Firm* — Miller Canfield (57) ABSTRACT

A seat assembly includes a seat back and seat cushion. A forward link pivotally extends between the seat cushion and base. A control bracket has a pair of pivotal links forming a four bar connection with the base. A control link pivotally extends between the seat cushion and control bracket. A seat back operatively coupled to the control bracket has a recliner mechanism for selectively pivoting the seat back between a forwardly folded position and a plurality of reclined seating positions. A guide link pivotally extends between the seat back and control link. Forward rotational movement of the seat cushion urges the seat back to rotate relative to the seat cushion moving the seat assembly to a stand-up position. Pivoting the seat back to the forwardly folded position urges the seat cushion to move forwardly and lower relative to the base moving the seat assembly to a kneeling position.

5 Claims, 8 Drawing Sheets

FOREIGN PATENT DOCUMENTS

| | | |
|---|---|---|
| DE | 202006004491 | 8/2006 |
| EP | 1625966 | 2/2006 |
| WO | 0003892 A2 | 1/2000 |
| WO | 2005044616 | 5/2005 |
| WO | 2006060413 | 6/2006 |
| WO | 2006089191 | 8/2006 |

* cited by examiner

STAND UP AND KNEEL SEAT

CROSS REFERENCE TO RELATED APPLICATION

This application is a national phase application and claims the benefit, under 35 U.S.C. 371, of PCT/CA2008/00063, filed on Jan. 16, 2008, which in turn claims priority to and all the benefits of U.S. Provisional Application Ser. No. 60/880,672, filed on Jan. 16, 2007 and entitled "Stand up and kneel seat."

BACKGROUND OF THE INVENTION

1. Field of the Invention

The invention relates to a seat assembly for an automotive vehicle. More particularly, the invention relates to a seat assembly that is movable between a seating position, a stand-up position, and a kneeling position.

2. Description of Related Art

It is common in certain mini-van and sport utility vehicles to provide third row seating. Typically, the vehicle includes a pair of front doors adjacent front row seating and a pair of rear doors located adjacent second row seating. The third row seating is located at the generally furthermost rear portion of the vehicle and is not located adjacent a door opening. Thus, passengers do not have direct access to the third row seating.

To provide access to the third row seating or a rear storage area, it is well known that the second row seating may have a releasable seat back locking mechanism which is capable of being manually actuated in order to pivot the seat back forwardly to an access position. Optionally, the second row seating may be movable to a tumbled position adjacent the front row seating, such as disclosed in U.S. Pat. No. 6,135,555 to Liu et al. In Liu, the seat back is first folded forward flat against the seat cushion and then both are pivoted about a pivot point at a lower front edge of the seat cushion approximately 90 degrees until the seat back and seat cushion are substantially upright. In this position, the seat back of the second row seating is disposed between the seat cushion of the second row seating and the front row seating. A passenger can then enter the vehicle through one of the rear doors, moving past the tumbled second row seating, to gain access to the third row seating or the rear storage area. However, movement of the second row seating in this manner can be difficult for some passengers, and the passageway for ingress and egress is often uncomfortably small for other passengers.

In order to provide better access to the third row seating it has been proposed to move the second row seating to a stand-up position, such as disclosed in U.S. Pat. No. 6,676,216 to Freijy et al. In Freijy, the seat cushion pivots forward about a pivot point at a lower front edge from a generally horizontal position for supporting a seat occupant to a generally vertical position. At the same time the seat back moves from a first vertical position for supporting the seat occupant to a second vertical position forward and upward of the first vertical position. The seat back and seat cushion move dependently due to a linkage therebetween. However, this embodiment of the second row seating disclosed in Freijy is not movable to a kneeling position lying against the floor for increasing the available cargo space in the rear storage area of the vehicle.

In seat assemblies that are stowable, the seat back is pivotally coupled to the seat cushion at a seat back pivot located between a lower end of the seat back and a rearward end of the seat cushion. The seat back pivot allows the seat back to pivot between a generally upright position and a forwardly folded position overlying the seat cushion. The seat cushion often includes a four-bar-linkage or front and rear legs extending between the seat cushion and the floor of the vehicle for moving the seat cushion between a raised position spaced above the floor and a lowered position resting along the floor. In the stowed position the seat cushion is in the lowered position and the seat back is in the forwardly folded position. Thus, a back side of the seat back is generally horizontal and parallel to the floor and defines a load floor when the seat assembly is in the stowed position.

It is therefore desirable to provide a seat assembly that is movable between a seating position and a stand-up position to improve access to an area behind the seat assembly. It is also desirable that the seat assembly be movable between the seating position and a kneeling position to increase the cargo space in the vehicle.

SUMMARY OF THE INVENTION

According to one aspect of the invention, a seat assembly is provided for supporting an occupant above a floor in an automotive vehicle. The seat assembly includes a seat back and seat cushion. A base is configured to be mounted to the floor of the vehicle. A forward link pivotally extends between the seat cushion and the base. A control bracket has a pair of pivotal links forming a four bar connection with the base. A control link pivotally extends between the seat cushion and the control bracket. The seat back is operatively coupled to the control bracket. The seat back has a recliner mechanism for selectively pivoting the seat back between a forwardly folded position and a plurality of reclined seating positions. A guide link pivotally extends between the seat back and the control link. Forward rotational movement of the seat cushion urges the seat back to rotate relative to the seat cushion and enables the seat assembly to move to a stand-up position. Pivoting the seat back to the forwardly folded position urges the seat cushion to move forwardly and lower relative to the base and enables the seat assembly to move to a kneeling position.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
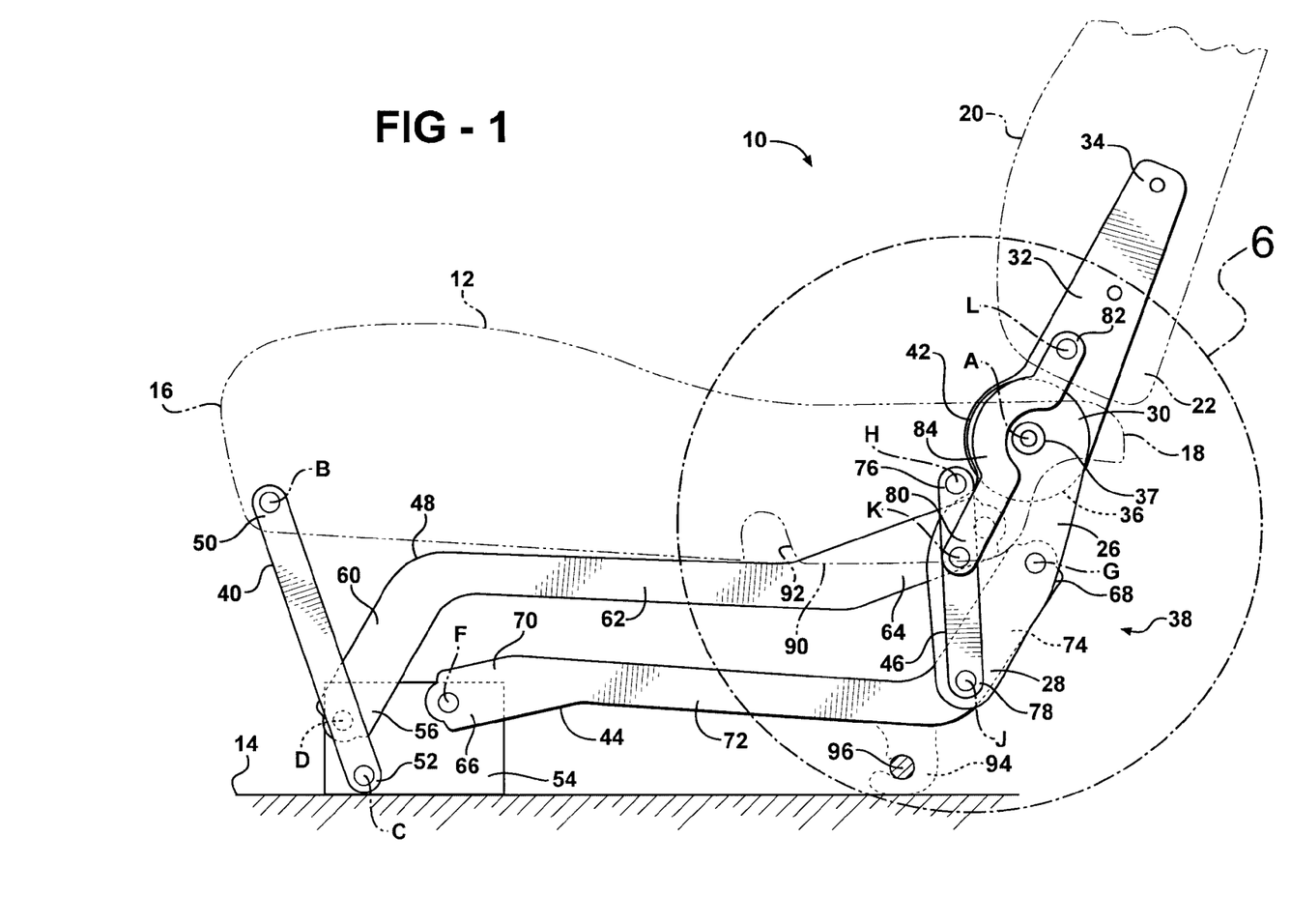
FIG. 1 is a side view of a seat assembly in a seating position including a linkage system according to one embodiment of the invention.
Figure 5:
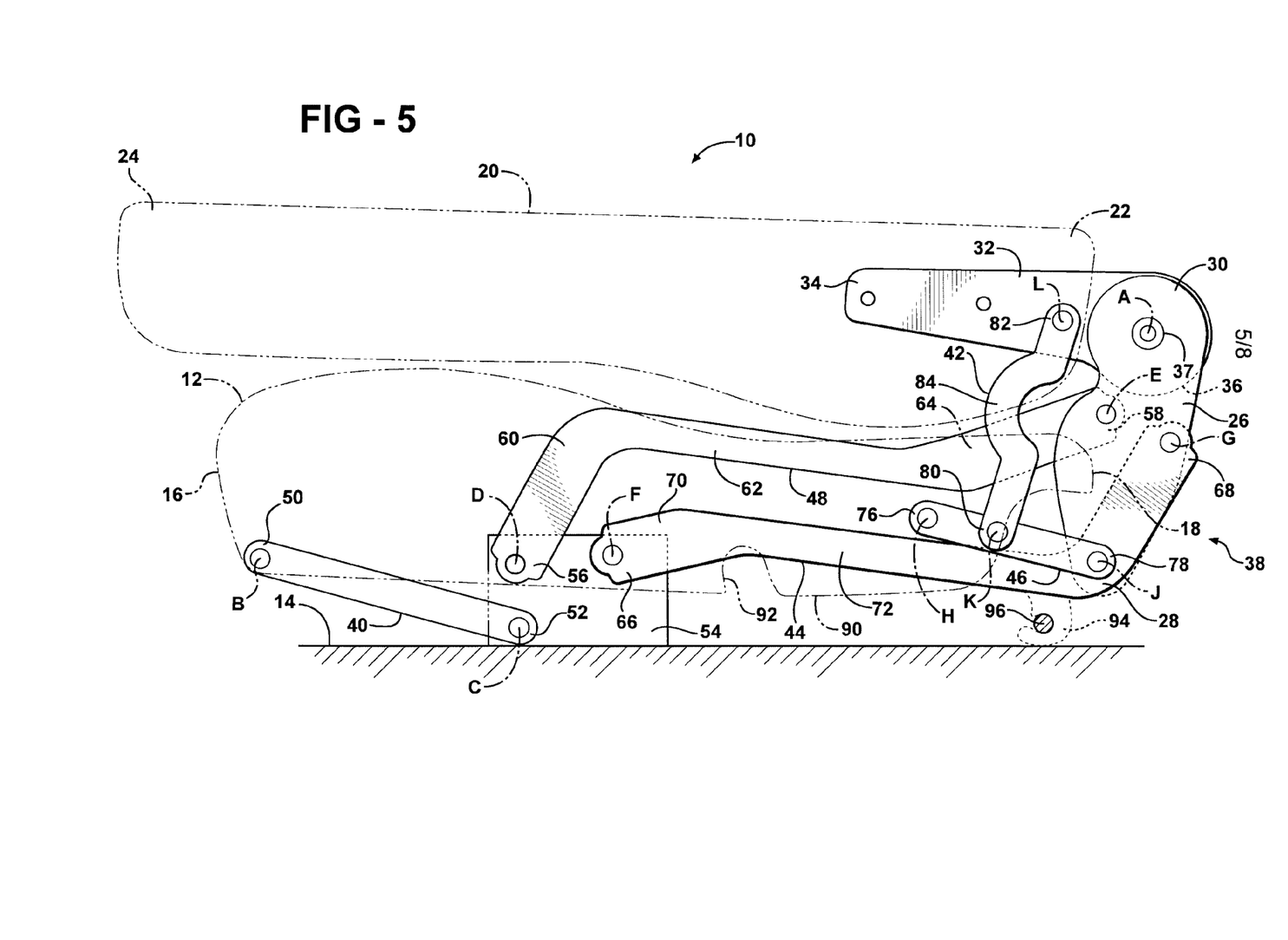
FIG. 5 is a side view of the seat assembly in a kneeling position.

Referring to FIG. 1, a seat assembly for an automotive vehicle is generally shown at 10. The seat assembly 10 is shown in a seating position and includes a seat cushion 12 for supporting a seat occupant above a floor 14 in the vehicle. The seat cushion 12 extends between a front end 16 and a rear end 18. The seat assembly 10 also includes a seat back 20 for supporting a back of the seat occupant. The seat back 20 extends between a lower end 22 and an upper end 24, as shown in FIG. 5.

While only one side of the seat assembly 10 is shown and will be described in detail, it is appreciated that both an inboard side and an outboard side are substantially the same. Referring to FIGS. 1 through 8, the outboard side of the seat assembly 10 is shown. A control bracket 26 is disposed at the rear end 18 of the seat cushion 12. The control bracket 26 extends between a first end 28 and a second end 30.

A seat back bracket 32 extends between an upper end 34 and a lower end 36. The upper end 34 of the seat back bracket 32 is fixedly secured to the lower end 22 of the seat back 20 by any known means. The lower end 36 of the seat back bracket 32 is pivotally coupled to the second end 30 of the control bracket 26 at pivot axis A. A disc recliner mechanism 37, as is well known in the art, an example of which is disclosed in U.S. Provisional Patent Application 60/669,146, operatively mounts the lower end 36 of the seat back bracket 32 to the second end 30 of the control bracket 26. The recliner mechanism 37 is operable between a locked state and an unlocked state to allow selective pivotal adjustment of the seat back 20 between a plurality of reclined seating positions. Additionally, the recliner mechanism 37 enables the seat back 20 to be pivoted to a forwardly folded position overlying the seat cushion 12, as shown in FIG. 5. Alternatively, any suitable recliner or latch mechanism could be used for coupling the lower end 36 of the seat back bracket 32 and the second end 30 of the control bracket 26.

Figure 3:
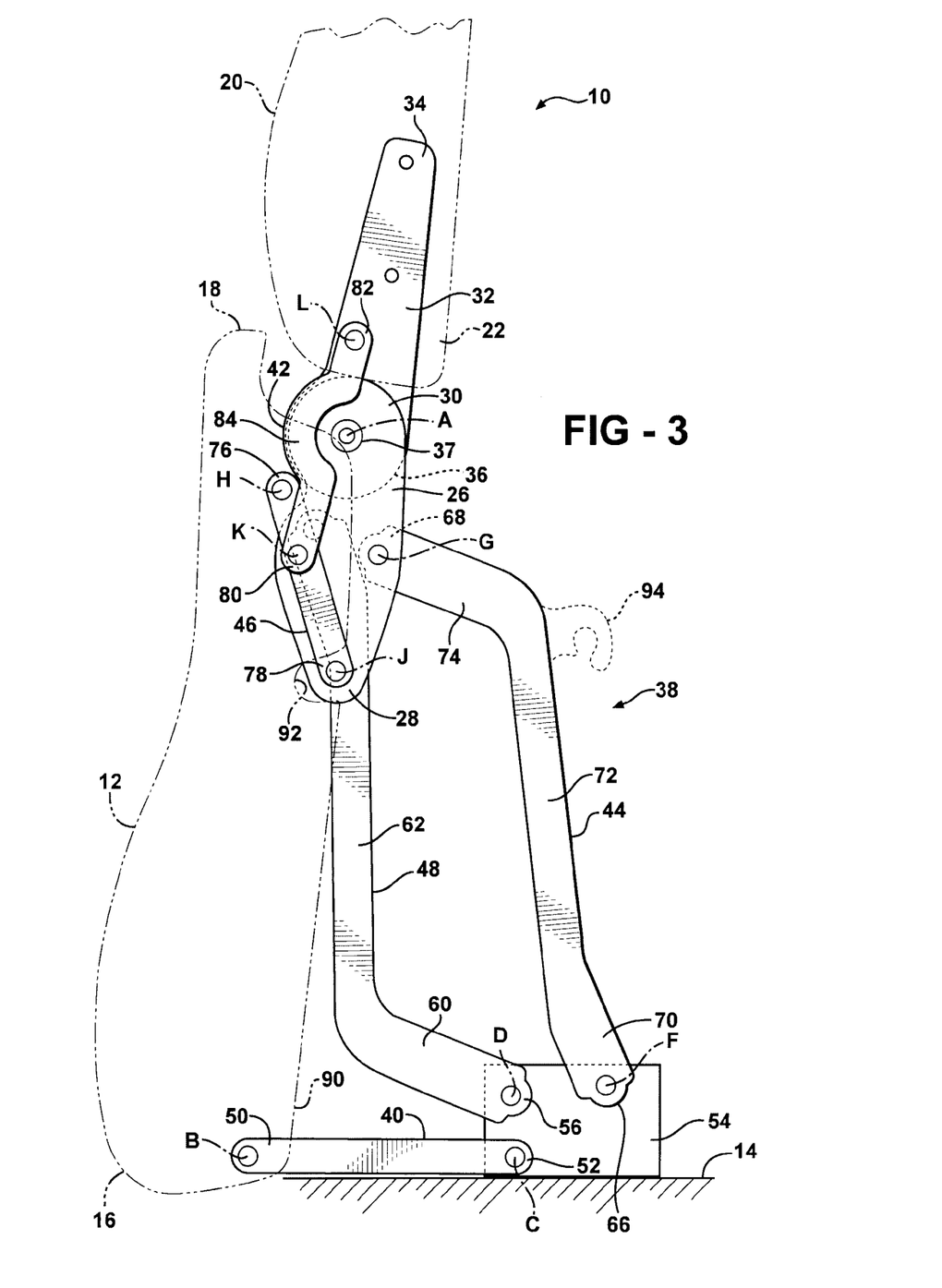
FIG. 3 is a side view of the seat assembly in a stand-up position.

The seat assembly 10 also includes a linkage system, generally shown at 38, for moving the seat assembly 10 between the seating position, shown in FIG. 1, and a stand-up position, shown in FIG. 3. In the seating position, the seat cushion 12 is in an elevated seating position spaced above the floor 14 and the seat back 20 is in a first upright position. In the stand-up position, the seat cushion 12 is in a forward vertical position such that the rear end 18 of the seat cushion 12 is positioned above the front end 16 of the seat cushion 12, and the seat back 20 is in a second upright position, forward and upward relative to the first upright position.

The linkage system 38 also moves the seat assembly 10 between the seating position, shown in FIG. 1, and a kneeling position, shown in FIG. 5. In the kneeling position, the seat cushion 12 is in a lowered position lying along the floor 14 and the seat back 20 is in the forwardly folded position, overlying the seat cushion 12.

The linkage system 38 includes a forward link 40, a guide link 42, a lower drive link 44, a control link 46, an upper drive link 48, and a base bracket 54. The base bracket 54 is configured to be mounted to the floor 14 or a seat track assembly (not shown). The forward link 40 extends between an upper end 50 and an opposite lower end 52. The upper end 50 of the forward link 40 is pivotally coupled to the front end 16 of the seat cushion 12 at pivot axis B. The lower end 52 is pivotally coupled to the base bracket 54 at pivot axis C.

Figure 4:
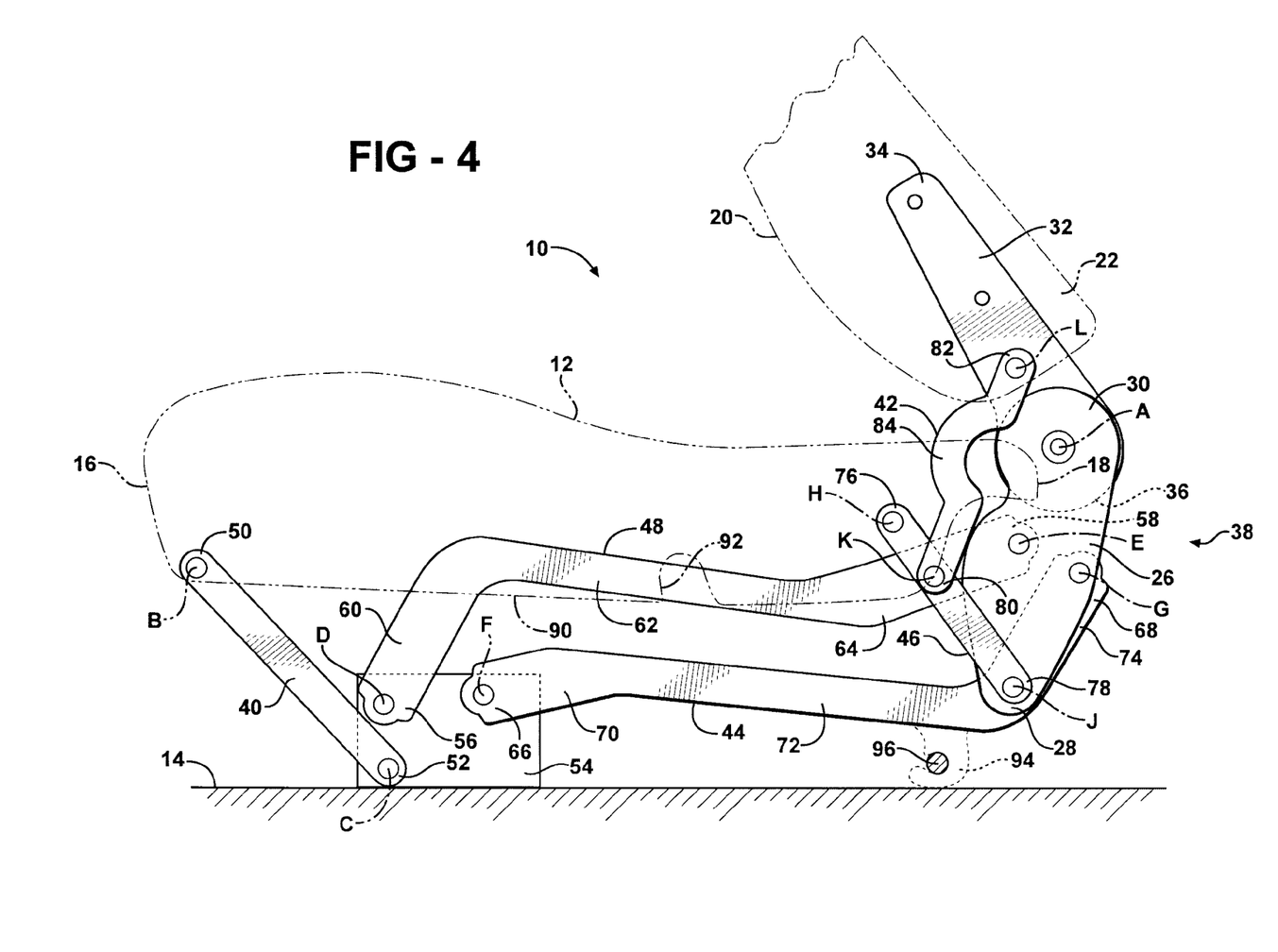
FIG. 4 is a side view of the seat assembly in an intermediate kneeling position.

The upper drive link 48 extends between a first end 56 and an opposite second end 58, best seen in FIG. 4. The first end 56 of the upper drive link 48 is pivotally coupled to the base bracket 54 at pivot axis D, which is positioned above pivot axis C. The second end 58 is pivotally coupled to the control bracket 26 at pivot axis E, between the first 28 and second 30 ends of the control bracket 26. In the embodiment shown, the upper drive link 48 is generally S-shaped, comprising a first portion 60 extending from the first end 56 to a second portion 62, and a third portion 64 extending from the second portion 62 to the second end 58.

The lower drive link 44 extends between a first end 66 and an opposite second end 68. The first end 66 of the lower drive link 44 is pivotally coupled to the base bracket 54 at pivot axis F, relatively rearward of pivot axis D. The second end 68 is pivotally coupled to the control bracket 26 at pivot axis G, relatively rearward of pivot axis E. In the embodiment shown, the lower drive link 44 is generally S-shaped, comprising a first portion 70 extending from the first end 66 to a second portion 72, and a third portion 74 extending from the second portion 72 to the second end 68.

The control link 46 extends linearly between a first end 76 and an opposite second end 78. The first end 76 of the control link 46 is pivotally coupled to the rear end 18 of the seat cushion 12 at pivot axis H. The second end 78 is pivotally coupled to the first end 28 of the control bracket 26 at pivot axis J.

The guide link 42 extends between a first end 80 and an opposite second end 82. The first end 80 of the guide link 42 is pivotally coupled to the control link 46 at pivot axis K, between pivot axis H and pivot axis J. The second end 82 is pivotally coupled to the seat back bracket 32 at pivot axis L, between the upper end 34 and the lower end 36. In the embodiment shown, the guide link 42 includes an arcuate portion 84 disposed between the first 80 and second 82 ends. The arcuate portion 84 of the guide link 42 provides clearance for a recliner handle (not shown) operatively coupled to the recliner mechanism 37 for actuating the recliner mechanism 37 between the locked and unlocked states. It will be appreciated that on the side of the seat assembly 10 without the recliner handle, the guide link 42 may extend linearly between the first 80 and second 82 ends without varying from the scope of the invention.

Figure 6:
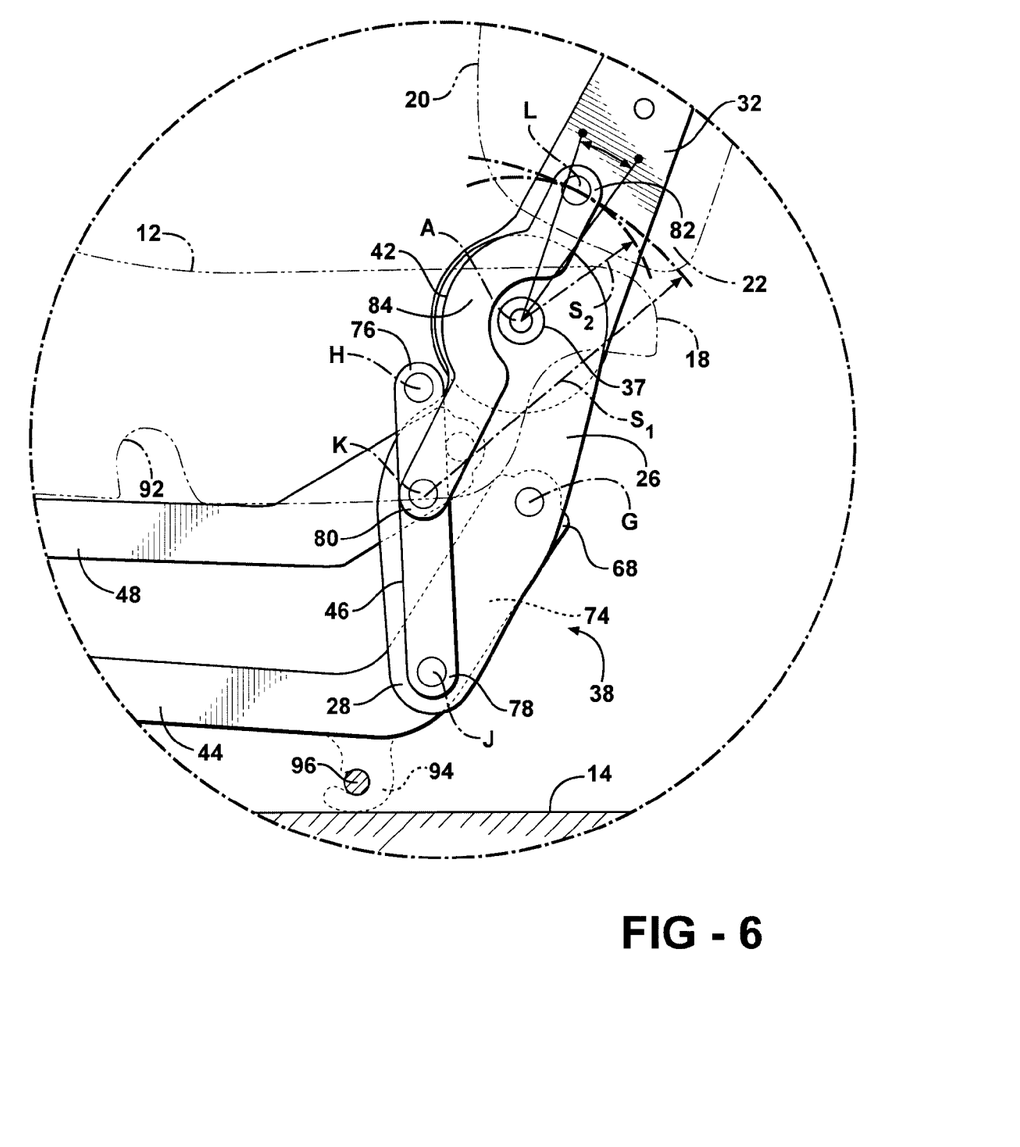
FIG. 6 is an enlarged side view of a portion of the linkage system when the seat assembly is in the seating position.

A first arc S1 defined by the guide link 42 pivoting about pivot axis K, as shown in FIG. 6, extends through pivot axis L. A second arc S2 defined by the seat back 20 pivoting about pivot axis A, also shown in FIG. 6, extends through pivot axis L. When the seat back 20 is in the first upright position, as shown in FIGS. 1 and 6, pivot axis K and pivot axis L of the guide link 42 are aligned with pivot axis A of the recliner mechanism 37 such that a portion of the first S1 and a portion of the second S2 arcs are contiguous. Therefore, the seat back 20 can be selectively pivotally adjusted about pivot axis A within the contiguous portions of the first S1 and second S2 arcs without actuating the linkage system 38. The plurality of reclined seating positions are defined within the limits of the contiguous portions of the first S1 and second S2 arcs.

In the embodiment shown, a bottom side 90 of the seat cushion 12 includes a cut-out or recess 92. When the seat assembly 10 is in the stand-up position, the pivotal connection at pivot axis J is disposed in the recess 92 allowing the control bracket 26 and seat back bracket 32 to generally vertically align with the seat back 20 and seat cushion 12, as shown in FIG. 3.

Figure 7:
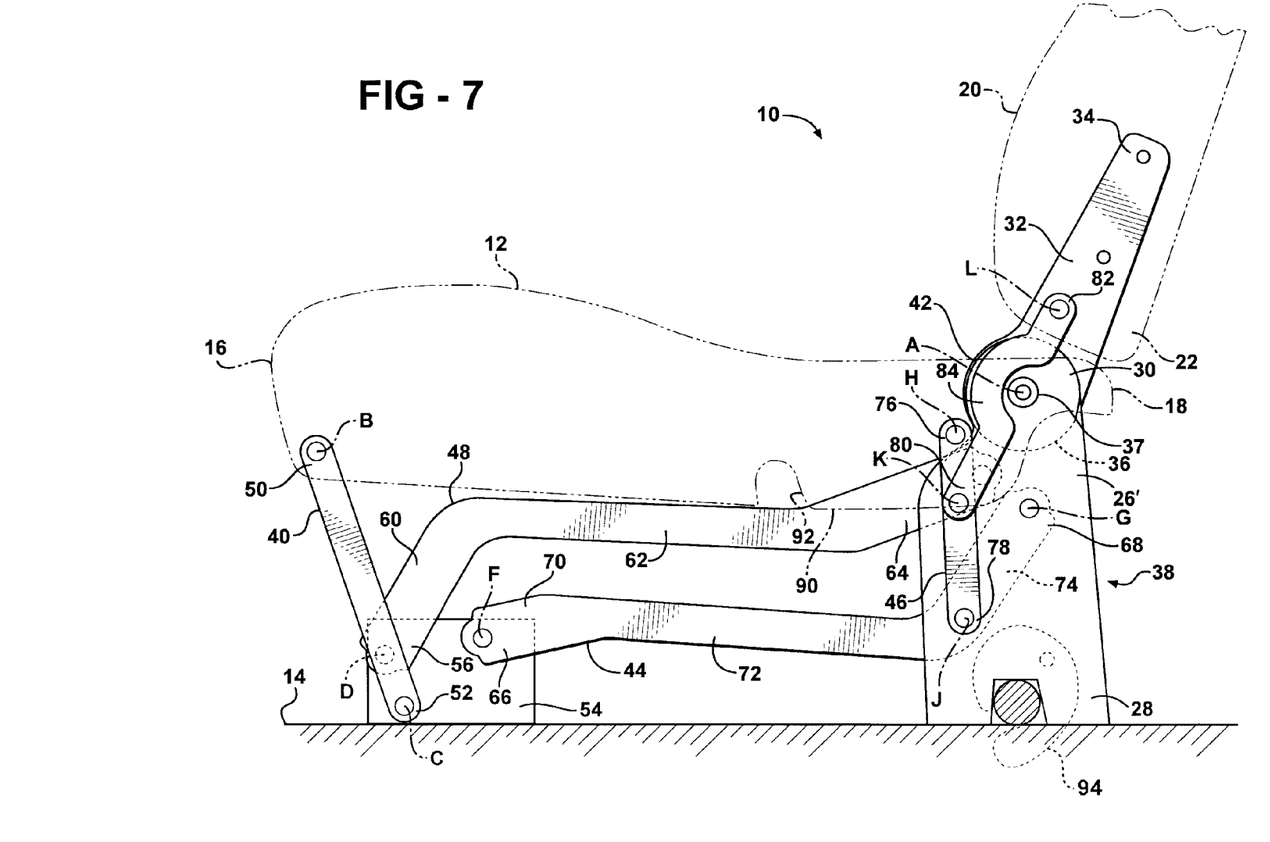
FIG. 7 is a side view of a seat assembly in a seating position including a linkage system according to a second embodiment of the invention.
Figure 8:
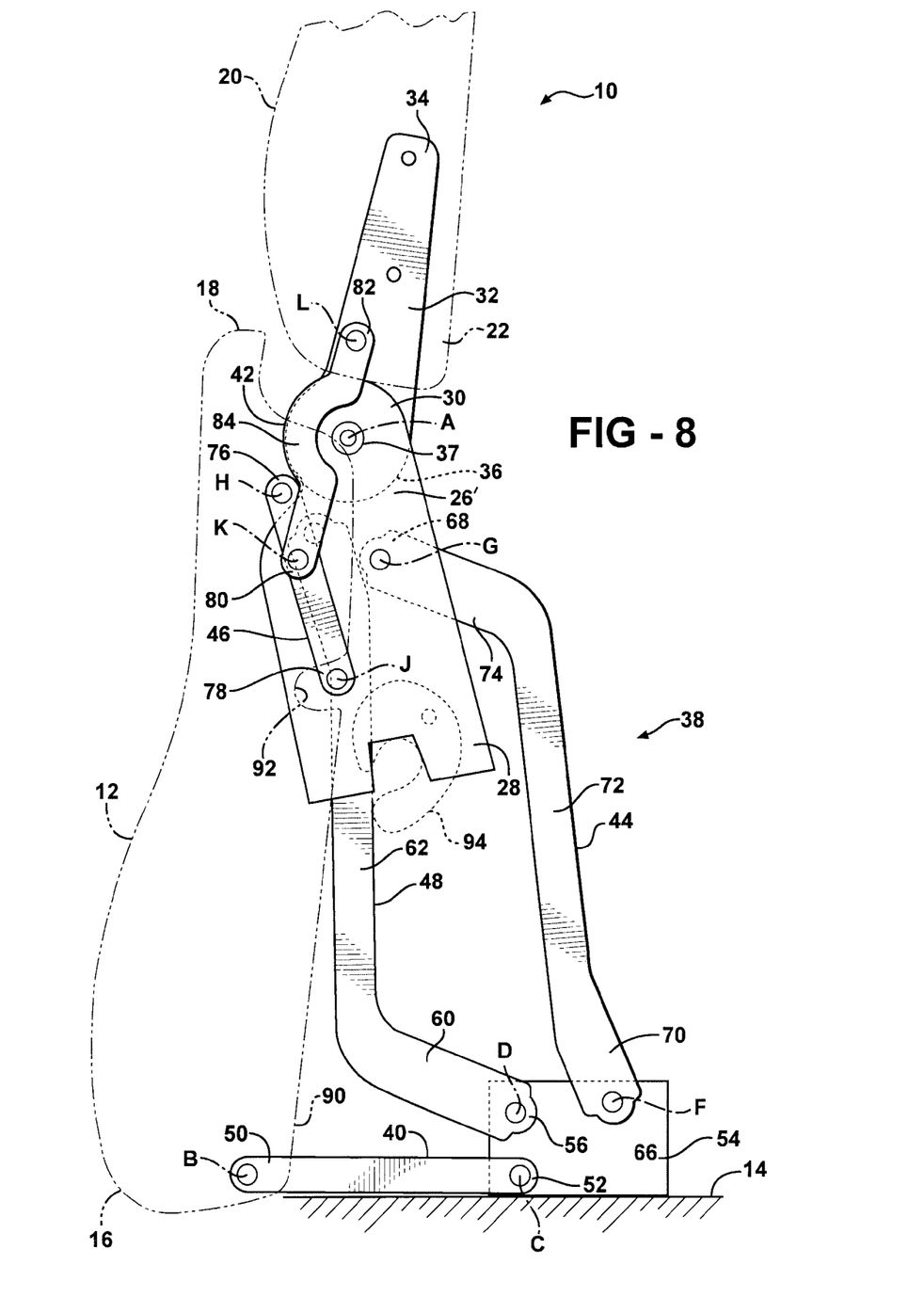
FIG. 8 is a side view of the seat assembly of FIG. 7 in a stand-up position.

The seat assembly 10 further includes a latch mechanism 94 of any suitable type known in the art for releasably securing the seat assembly 10 to the floor 14. In FIGS. 1 through 6, the latch mechanism 94 is illustrated in hidden lines mounted to the second portion 72 of the lower drive link 44. It is appreciated that the latch mechanism 94 could in the alternative be incorporated into the first end 28 of an elongated control bracket 26', as shown in FIGS. 7 and 8, wherein like primed reference numerals represent similar elements as discussed above, without varying from the scope of the invention. The latch mechanism 94 is operable between a latched state and an unlatched state. In the latched state, the latch mechanism 94 is securely coupled to a striker bar 96 mounted to the floor 14 and maintains the seat assembly 10 in the seating position. In the unlatched state, the latch mechanism 94 is released from the striker bar 96 to allow the seat assembly 10 to move between the seating position and the stand-up position.

Figure 2:
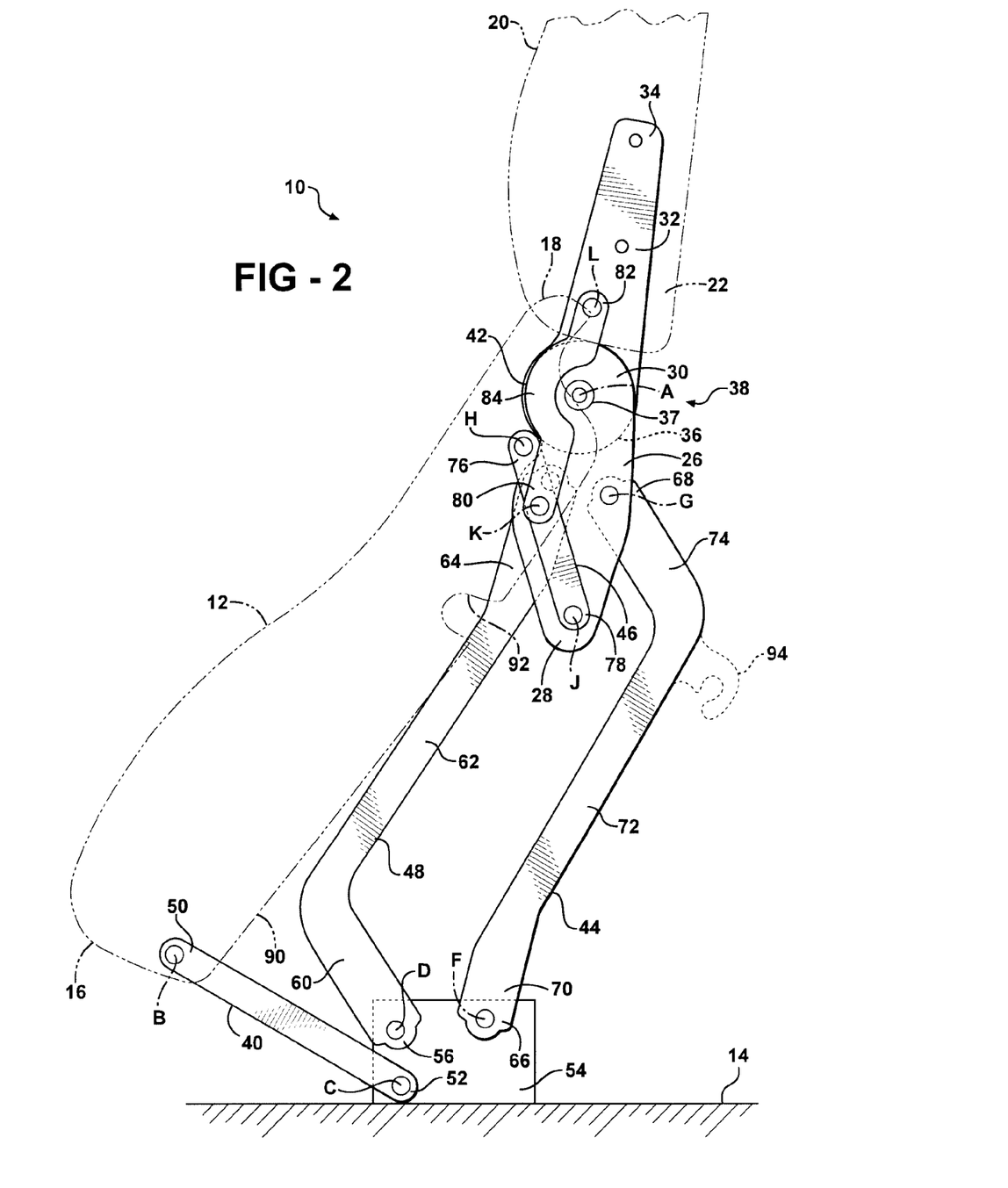
FIG. 2 is a side view of the seat assembly in an intermediate stand-up position.

In operation, starting with the seat assembly 10 in the seating position, as shown in FIG. 1, a release handle (not shown) is actuated to release the latch mechanism 94 from the striker bar 96. The seat assembly 10 can now be moved from the seating position to the stand-up position. As the seat assembly 10 is moved forwardly, the forward link 40 pivots in a counterclockwise direction about pivot axis C and the seat cushion 12 pivots in the counterclockwise direction from the elevated seating position to the forward vertical position, as shown in FIGS. 2 and 3. At the same time, the lower drive link 44 and the upper drive link 48 each pivot in the counterclockwise direction about pivot axes F and D, respectively. The second end 68 of the lower drive link 44 pulls downwardly on the control bracket 26, 26' and urges the control bracket 26, 26' to pivot about pivot axis A in a clockwise direction relative to the seat cushion 12. As the control bracket 26, 26' pivots in the clockwise direction, the first end 28 of the control bracket 26, 26' causes the control link 46 to also pivot in the clockwise direction about pivot axis H. The control link 46 in turn causes the guide link 42 to pivot in the clockwise direction about pivot axis K. Since the recliner mechanism 37 is locked, the clockwise movement of the control bracket 26, 26' results in the seat back bracket 32, and thus the seat back 20, pivoting about pivot axis A in the clockwise direction relative to the seat cushion 12. The seat back 20 pivots in the clockwise direction until the seat back 20 is in the second upright position. The seat assembly 10 is now in the stand-up position, as shown in FIG. 3.

To return to the seating position, the seat assembly 10 is moved rearwardly, which causes the seat cushion 12 to pivot in the clockwise direction. The clockwise movement of the seat cushion 12 causes the forward link 40 to pivot in the clockwise direction about pivot axis C. At the same time, the lower drive link 44 and the upper drive link 48 each pivot in the clockwise direction about pivot axes D and F, respectively. The second end 68 of the lower drive link 44 pushes upwardly on the control bracket 26, 26' and urges the control bracket 26, 26' to pivot about pivot axis A in the counterclockwise direction relative to the seat cushion 12. As the control bracket 26, 26' pivots in the counterclockwise direction, the first end 28 of the control bracket 26, 26' causes the control link 46 to also pivot in the counterclockwise direction about pivot axis H. The control link 46 in turn causes the guide link 42 to pivot in the counterclockwise direction about pivot axis K. Since the recliner mechanism 37 is locked, the counterclockwise movement of the control bracket 26, 26' results in the seat back bracket 32, and thus the seat back 20, pivoting about pivot axis A in the counterclockwise direction relative to the seat cushion 12. The seat back 20 pivots in the counterclockwise direction until the seat back 20 is in the first upright position and the latch mechanism 94 engages the striker bar 96. The seat assembly 10 is now in the seating position, as shown in FIG. 1.

Starting with the seat assembly 10 in the seating position, as shown in FIG. 1, the recliner handle is actuated to unlock the disc recliner mechanism 37. The seat assembly 10 can now be moved from the seating position to the kneeling position. As the seat back 20 pivots in the counterclockwise direction about pivot axis A from the first upright position to the forwardly folded position, the lower end 22 of the seat back 20 urges the guide link 42 downward and forward. The downward and forward movement of the guide link 42 urges the control link 46 to pivot in the counterclockwise direction about pivot axis J, which therefore causes the seat cushion 12 to move forward and downward. At the same time, the forward link 40 pivots in the counterclockwise direction about pivot axis C such that the seat cushion 12 moves from the elevated seating position to the lowered position lying along the floor 14. The seat assembly 10 is now in the kneeling position, as shown in FIG. 5.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly for supporting an occupant above a floor in an automotive vehicle, said seat assembly comprising:
   a seat cushion adapted to be pivotally coupled to the floor, said seat cushion extending between a front end and a rear end;
   a seat back operatively coupled to said seat cushion for movement between first and second vertical positions and a forwardly folded position overlying said seat cushion, said seat back extending between a lower end and an upper end;
   a control bracket extending between an upper first end and a lower second end, said seat back pivotally coupled to said upper first end defining a pivot axis for providing pivotal movement of said seat back between a plurality of reclined seating positions and said forwardly folded position; and
   a linkage system operatively coupled between said seat back and said seat cushion, wherein said linkage system urges said seat back to rotate relative to said seat cushion between said first and second vertical positions in response to pivotal movement of said seat cushion between a generally horizontal seating position and a forward generally vertical position, and wherein said linkage system urges said seat cushion between said seating position and a lowered generally horizontal position in response to pivotal movement of said seat back between said first vertical position and said forwardly folded position;
   wherein said linkage system includes;
   a base bracket configured to be mounted to the floor;
   a forward link extending between an upper end pivotally coupled to said front end of said seat cushion defining a pivot axis for pivotal movement of said seat cushion between said horizontal seating position, said forward vertical position and said lowered horizontal position and a lower end pivotally coupled to said base bracket defining a pivot axis for pivotal movement of said forward link;
   a lower drive link extending between a first end pivotally coupled to said base bracket defining a pivot axis for pivotal movement of said lower drive link and a second end pivotally coupled to said control bracket defining a pivot axis to assist the pivotal movement of said control bracket in response to pivotal movement of said seat cushion between said seating and vertical positions;
   an upper drive link extending between a first end pivotally coupled to said base bracket defining a pivot axis for pivotal movement of said upper drive link and a second end pivotally coupled to said control bracket between said upper first end and said lower second end of said control bracket defining a pivot axis for pivoting said upper drive link about said control bracket;

a control link extending linearly between a first end and an opposite second end, said first end pivotally coupled to said rear end of said seat cushion defining a pivot axis for pivoting said control link about said seat cushion thereof, and said second end of said control link pivotally coupled to said lower second end of said control bracket defining a pivot axis for pivoting said control link about said control bracket thereof; and a guide link extending between a first end pivotally coupled to said control link between said first and second ends thereof defining a pivot axis for pivoting said guide link about said control link and a second end pivotally coupled to said lower end of said seat back defining a pivot axis for pivoting said guide link about said seat back;

wherein said seat cushion includes a bottom side having a recess for receiving the pivotal connection between said second end of said control link and said lower second end of said control bracket.

2. A seat assembly as set forth in claim 1 including a recliner mechanism operatively coupled between said lower end of said seat back and said upper first end of said control bracket for allowing selective pivotal adjustment of said seat back between said plurality of reclined seating positions and said forwardly folded position.

3. A seat assembly as set forth in claim 2 wherein said guide link includes an arcuate portion between said first and second ends to provide clearance for actuating said recliner mechanism.

4. A seat assembly as set forth in claim 3 including a latch mechanism mounted to said lower drive link for releasably securing said seat assembly to the floor.

5. A seat assembly as set forth in claim 3 including a latch mechanism mounted to said control bracket for releasably securing said seat assembly to the floor.

* * * * *